United States Patent [19]

Nomura et al.

[11] 3,924,064

[45] Dec. 2, 1975

[54] X-RAY INSPECTION EQUIPMENT FOR BAGGAGE

[75] Inventors: Yasuji Nomura; Koichi Koike; Kazuo Yamamoto, all of Kashiwa, Japan

[73] Assignee: Hitachi Medical Corporation, Tokyo, Japan

[22] Filed: Mar. 26, 1974

[21] Appl. No.: 454,920

[30] Foreign Application Priority Data

Mar. 27, 1973 Japan ................................ 48-34785
Mar. 27, 1973 Japan ................................ 48-24786

[52] U.S. Cl. ........ 178/6.8; 178/DIG. 1; 178/DIG. 5
[51] Int. Cl.[2] ............................................ H04N 7/18
[58] Field of Search ........... 178/6.8, DIG. 1, DIG. 5

[56] References Cited

UNITED STATES PATENTS

| | | | |
|---|---|---|---|
| 3,049,588 | 8/1962 | Barnett | 178/DIG. 33 |
| 3,621,246 | 11/1971 | Horsey | 178/DIG. 5 |
| 3,674,924 | 7/1972 | Fischer | 178/DIG. 1 |
| 3,679,823 | 7/1972 | Corrigan | 178/DIG. 5 |
| 3,745,245 | 7/1973 | Yunde | 178/DIG. 5 |

*Primary Examiner*—Howard W. Britton
*Attorney, Agent, or Firm*—Wenderoth, Lind & Ponack

[57] ABSTRACT

An X-ray inspection apparatus for baggage whereby regenerating an X-ray image of an object is disclosed. X-rays are radiated to the object in the form of pulses, and the image is converted to a video-signal for one field and recorded. The recorded video-signal is repeatedly regenerated at field cycle until a next video-signal is produced. In such a system, inspection may be made while the object is being rapidly transferred at an extremely low X-ray radiation level.

6 Claims, 19 Drawing Figures

X-RAY INSPECTION EQUIPMENT FOR BAGGAGE

BACKGROUND OF THE INVENTION

1. Field of the Invention

This invention relates to equipment which inspects baggages by X-ray.

2. Description of the Prior Art

Methods of inspecting objects by means of X-ray radiation are well known in the prior art. However, conventional equipment which needs to radiate X-rays continuously, high radiation level being this required, cannot inspect objects which cannot be safely subjected to said high radiation level. Furthermore, while the object should be inspected from a plurality of directions, inspection with prior art systems can be made in only one direction because of the high level of the required radiation. At the same time, in accordance with the conditions of the object, it may occur that no X-ray inspection is permitted. When inspection is made while the object is being transferred, it is required that the object be momentarily stopped to be inspected or be transferred at extremely low speed. Otherwise, it is hard to inspect the object.

SUMMARY OF THE INVENTION

It is an object of the invention to provide apparatus which is capable of X-ray inspection on the object at an extremely low X-ray radiation level.

Another object of the invention is to provide apparatus which is capable of inspecting the object in a plurality of directions at a low X-ray radiation level.

Another object of the invention is to provide apparatus which is capable of reliable inspection of objects being transferred at high speed.

Another object of the invention is to provide X-ray inspection apparatus which is capable of regenerating a monitor image of the object, if required, which is stored when the object is under suspicion.

Another object of the invention is to provide X-ray inspection apparatus which is capable of optionally monitoring the X-ray image taken in a plurality of directions and of stopping the transfer of the object which is under suspicion.

Another object of the invention is to provide apparatus which is capable of monitoring the X-ray image of the object taken in a plurality of directions and of inspecting the object in other directions, if necessary, when the object is under suspicion.

Another object of the invention is to provide apparatus which is capable of automatically inspecting a portion of the object outside a predetermined inspection area smaller than the object.

Other objects of the invention will be apparent from the following detailed description of the invention and the attached drawings.

BRIEF DESCRIPTION OF THE DRAWINGS

FIG. 1(A) and FIG. 1(B) are block diagrams of a system for practicing the subject invention. FIG. 2 shows an output wave from each element of FIGS. 1(A) and 1(B).

FIG. 3 is a plan view of an airport lobby illustrating an arrangement of the apparatus. FIG. 4(A) and FIG. 4(B) are block diagrams illustrating an arrangement of the system. FIG. 5 shows output waves from each element.

FIG. 6(A) and FIG. 6(B) are block diagrams thereof. FIG. 7 shows output waves from each element of this embodiment.

FIG. 8(A) and FIG. 8(B) are block diagrams and FIG. 9 shows output waves from each element of the block diagrams.

FIG. 11 is a block diagram and FIG. 12 shows output waves from each element.

DETAILED DESCRIPTION OF THE PREFERRED EMBODIMENTS

Figure 1A:
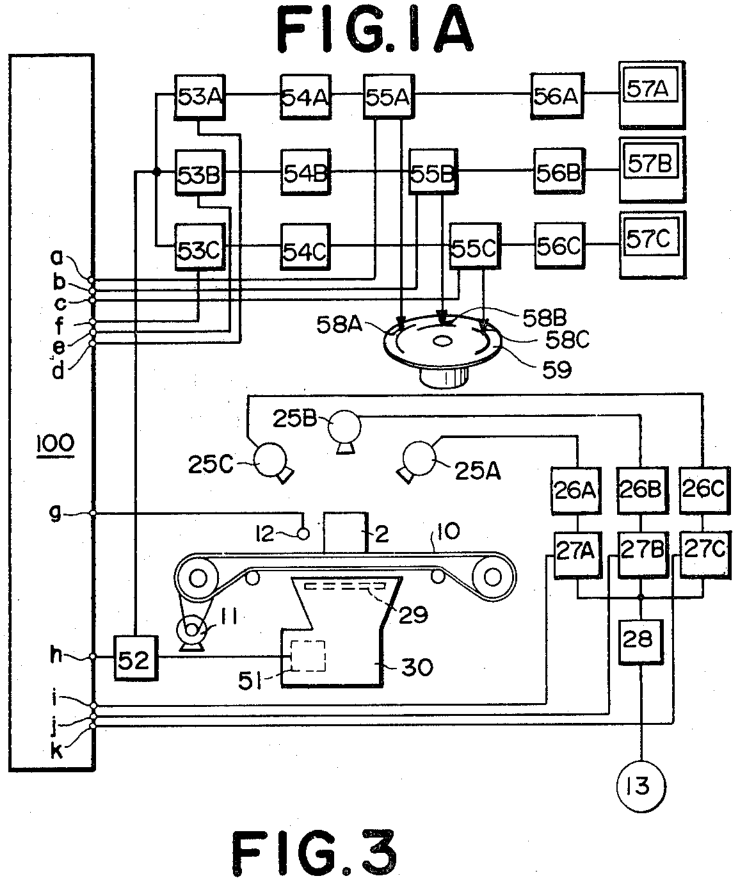
FIG. 1(A), FIG. 1(B) and FIG. 2 show an embodiment of the X-ray inspection apparatus of the present invention.
Figure 1B:
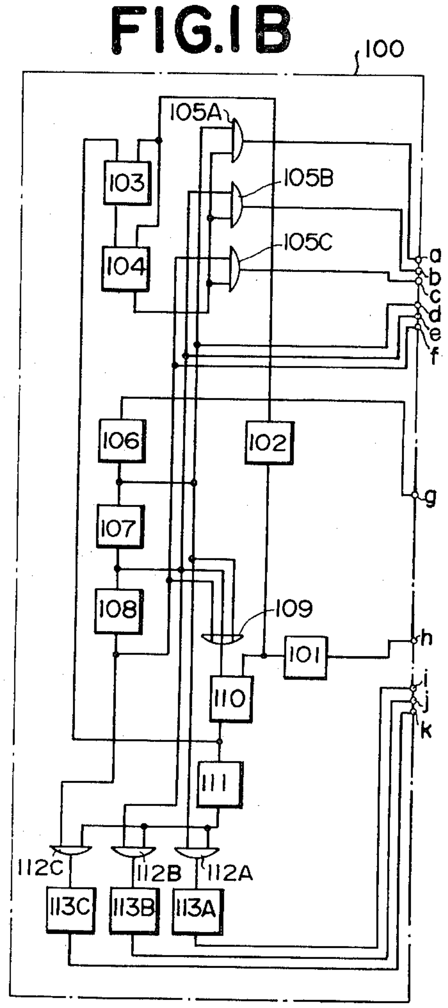

FIG. 1(A) and FIG. 1(B) show an embodiment of the present invention. The conveyer 10 is of a conventional type, and comprises one endless belt and two rolls engaged therewith, one roll being driven by the motor 11. The object to be inspected 2 is transported in the right hand direction on the belt as shown in the figure. The position-detector 12 placed near the conveyer, when the object 2 passes it, energizes the control device 100 mentioned below. Various types of detectors can be used. In this case, however, the detector, consisting of a projector and a receiver arranged on opposite sides of the belt, is of such a type that the receiver sends out a signal when a beam from the projector to the receiver is blocked by the object. In the figure, only the receiver is shown.

Three X-ray tubes 25A, 25B, 25C are installed in a straight line along the direction of travel of the object 2, each being directed in different directions from one another to allow the three-direction inspection of the object 2. The X-ray generating unit comprises the X-ray tubes, high-voltage transformers 26A, 26B, 26C and switch circuits 27A, 27B, 27C which are connected to power source 13 through autotransformer 28. A fluoroscope 29 is placed under the conveyer facing the X-ray tubes, and gives the X-ray image of the object 2. The fluoroscope is placed in the dark-box 30. In the dark-box, a T.V. camera 51 is installed, which photographs the X-ray image on the fluoroscope and converts it into a video-signal. The T.V. camera 51 is connected to the camera-controller 52, and to the monitor televisions 57A, 57B, 57C, respectively, through video-switches 53A, 53B, 53C, F.M. modulators 54A, 54B, 54C, video-gates 55A, 55B, 55C and F.M. demodulators 56A, 56B, 56C. The videogates are connected to a video-recorder which is similar to a video-disk recorder using a magnetic disk. The video-gates, according to the signal from the control device 100, record the video-signal transmitted by the T.V. camera on a tape or a video-disk 59 through video-heads 58A, 58B, 58C of the video-recorder, and also, according to the signal from the control device 100, send the recorded signal to the F.M. modulators to display the images on the monitor T.V.

FIG. 1(B) is a detailed view of the control device 100. In the figure, 101 is a pulse-generator connected to the power source 13, and it generates a signal of the same phase as that of the voltage in the power source. Numeral 102 inicates a synchronizing-signal-generator. Numerals 103 and 104 denote flip-flop circuits. Reference numerals 105A, 105B and 105C denote AND circuits. Numerals 106, 107 and 108 indicate mono-multi-circuits (hereinafter called M.M. circuit) controlled by the output of the position-detector 12, and are connected to a cascade. By the signal from the position-detector 12, the M.M. circuit 106 generates an output for a certain period, at the termination of which the M.M. circuit 107 starts generating an output for a certain period. Then when the output of the M.M. circuit 107 is terminated, the M.M. circuit 108 starts generating an output for a certain period. Reference number 109 indicates an OR circuit and numeral 110 denotes a flip-flop circuit (hereinafter called F.F. circuit). Numeral 111 represents an M.M. circuit, while 112A, 112B and 112C indicate AND circuits. Numerals 113A, 113B and 113C denote thyristor-ignition signal-generating circuits.

Figure 2:
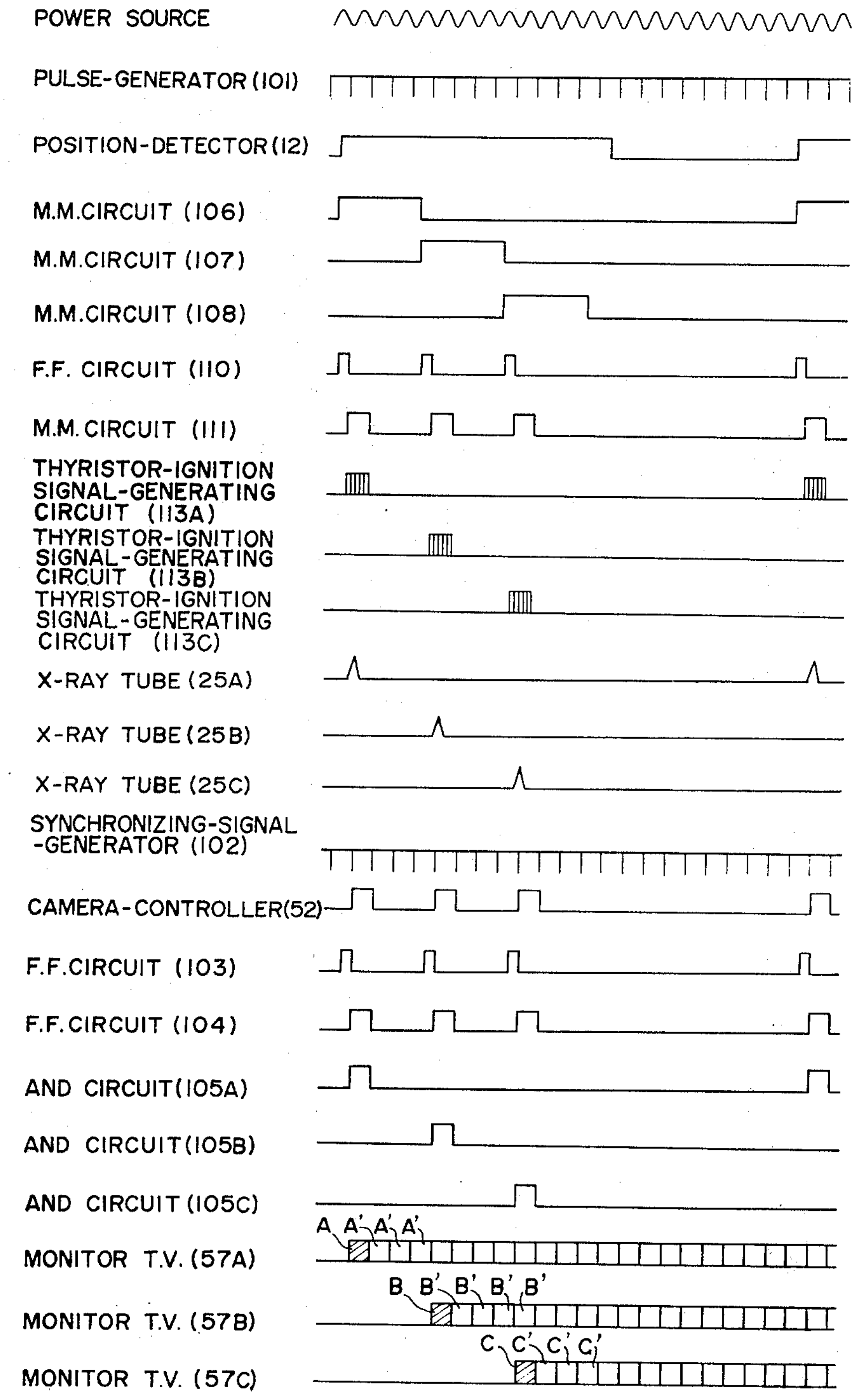

Referring now to FIG. 2, the performance of the above-mentioned X-ray inspection apparatus is described below. First, is driven the conveyer 10 in the direction of the arrow, and the object 2 is positioned thereupon. When the object 2 is transported to a required position, the position-detector 12 develops an output, which energizes the M.M. circuit 106. As a result, the M.M. circuit 106 generates an output for a certain period. This output will be applied to the video-switch 53A, and to the AND circuits 105A and 112A. At the same time this output is provided to the F.F. circuit 110 through the OR circuit 109 and places the F.F. circuit in a set-state. The F.F. circuit 110, after setting, is reset by the first signal from the pulse generator 101. The voltage at the time of this resetting sets the F.F. circuit 103 and energizes the M.M. circuit 111. The output of the M.M. circuit 111 together with that of the M.M. circuit 106 causes the AND circuit 112A to develop an output which controls the ignition-signal-generating circuit 113A. Then the switch circuit 27A will be closed for half a cycle, and X-rays will be generated in the form of a pulse in the X-ray tube 25A.

On the other hand, the F.F. circuit 103, after setting, is reset by the next signal from the synchronizing-signal generator 102. Then the F.F. circuit 104 is set by the voltage at the time of this resetting. The output of the F.F. circuit 104 together with that of the M.M. circuit 106 causes the AND circuit 105a to switch the video-gate 55A to a recording-state. The video-signal of the X-ray image of the object 2 obtained by the energized X-ray tube 25A, since the video-switch 53A is already open, is recorded on the video-disk 59 by the video-head 58A through the F.M. modulator 54A and the video-gate 55A. At the same time the X-ray image X1 of the object 2 is developed on the monitor T.V. 57(A) through the F.M. demodulator 56A. Upon completion of one-field of recording, the synchronizing-signal-generator 102 sends out the next signal, which resets the F.F. circuit 104, in consequence of which the output of the AND circuit 105A is terminated. From the next field the video-gate 55A switches the video-head 58A to a reproducing-state, which reproduces the above-mentioned signal recorded on the video-disk 59. Then the reproducing signal is transferred to the monitor T.V. 57(A) through the demodulator 56A. Thus the recorded one-field signal is repeatedly added to the monitor 57A, on which the X-Ray image X1′ of the object is given continuously at the field-cycle.

When the operating period of the M.M. circuit 106 expires, its output disappears and the M.M. circuit 107 produces the output. In this case, similarly to the above, the switch-circuit 27B is closed, and the video-gate 53B and the video-gate 54B is controlled, and the X-ray image of the oject 2 is recorded by the X-ray tube 25B on the video-disk 59. At the same time, the X-ray image X2 is transferred to on the monitor T.V. Thereafter, the X-ray image X2′ by the reproducing-signal will be displayed continuously on the monitor T.V. 57B. When the preset operating period of the M.M. circuit 107 is up, the M.M. circuit 108 begins to generate an output, and similarly to the above, the X-ray tube 25C is energized and the X-ray images X3 and X′3 are displayed on the monitor T.V. 57(C). During the abovementioned X-ray irradiation and recording of the images, the conveyer 10 is continously driven and the series of operations is completed while the object 2 is above the fluoroscope 29. When the next object to be inspected is placed on the conveyer, the position-detector sends out another signal, and the above-mentioned series of operations is repeated.

In the X-ray inspection system of the present invention, X-ray images taken in three directions can be obtained on each monitor T.V. during the abovementioned series of operations. Therefore, the observer can look into the luggage with ease and reliability by consulting these X-ray images. Furthermore, in this X-ray inspection apparatus, three X-ray tubes are placed in alignment with the direction of movement of the object, and the X-ray tubes are excited one after another from where the object is transported. Therefore, the X-ray tubes, the center of the object and the center of the fluoroscope can be aligned without stopping the conveyer, which enables the observer to get the appropriate X-ray images in a short time.

Figure 3:
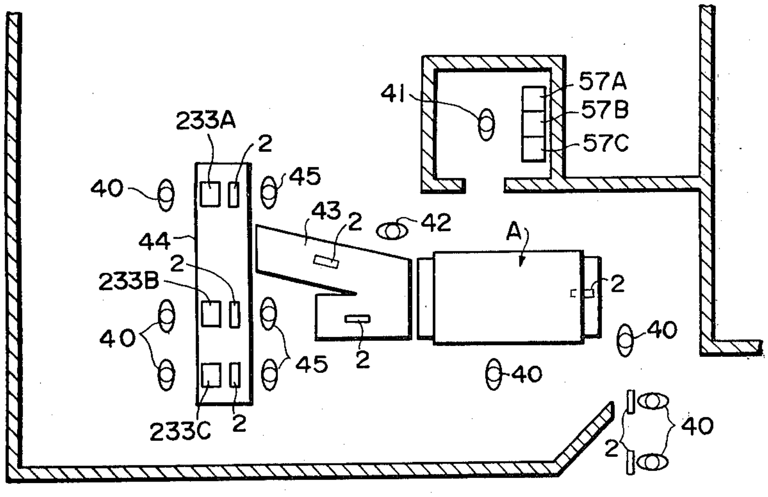
FIG. 3, FIG. 4(A), FIG. 4(B) and FIG. 5 show an inspection apparatus for checking carry-on baggage in airports, using the X-ray inspection apparatus of the present invention.
Figure 5:
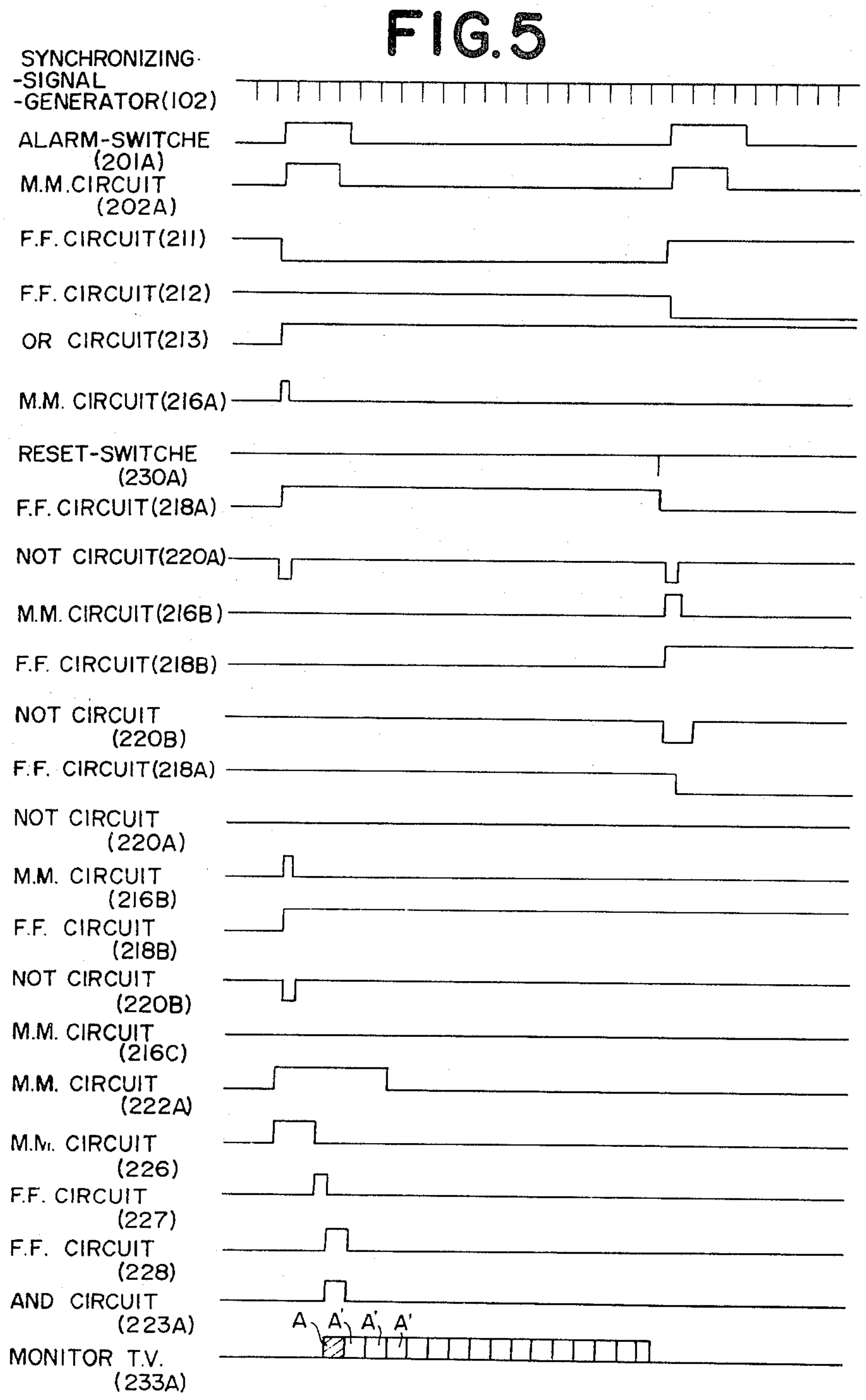

FIG. 3 and FIG. 5 show an arrangement to inspect carry-on baggage at a departure lobby in an airport, using the X-ray inspection apparatus shown in FIG. 1.

As shown in FIG. 3, the carry-on baggage 2 of passengers 40 are put on the conveyer 10 in the apparatus designated by reference letter A, and the X-ray images of the baggage obtained by the system A are displayed on the monitor televisions 57A, 57B, 57C. If the observer 41 of the X-ray images finds a weapon in the baggage, he sends an alarm to the sorter 42 and transmits the X-ray images to the inspectors' monitor televisions 233A, 233B, 233C. Then the sorter, in response to the alarm, puts the baggage under suspicion on secondary-conveyer 43, and the inspector inspects the baggage on inspection desk 44 in the presence of the owner of the baggage by watching the monitor T.V. When no weapon is found by the observer 41, neither alarm nor X-ray image are sent out, and the passenger can pick up his baggage at the exit of the apparatus A and proceed directly to the lobby.

Figures 4A, 6A:
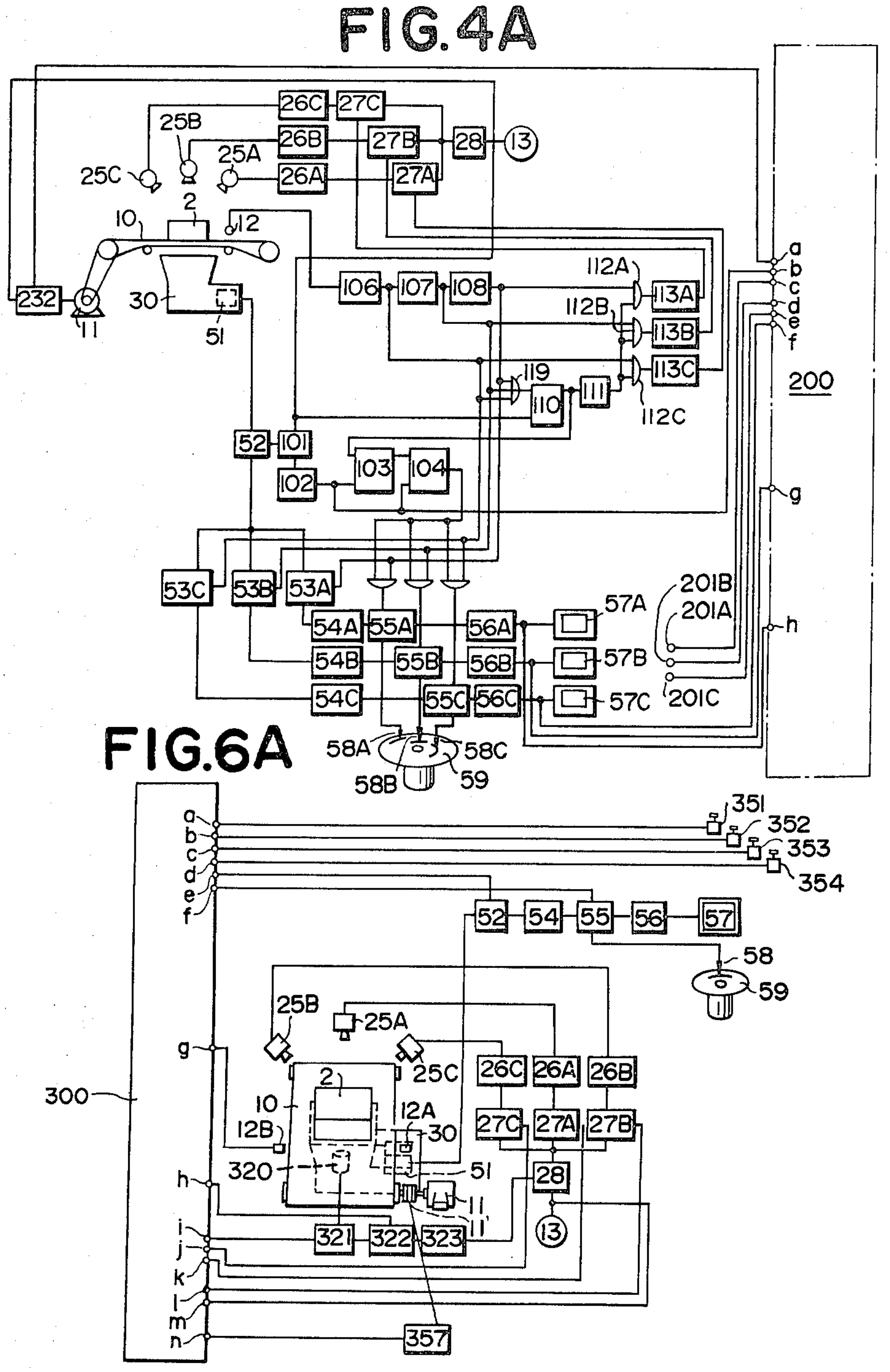
FIG. 6(A), FIG. 6(B) and FIG. 7 show another embodiment of the X-ray inspection apparatus of the present invention.
Figure 4B:
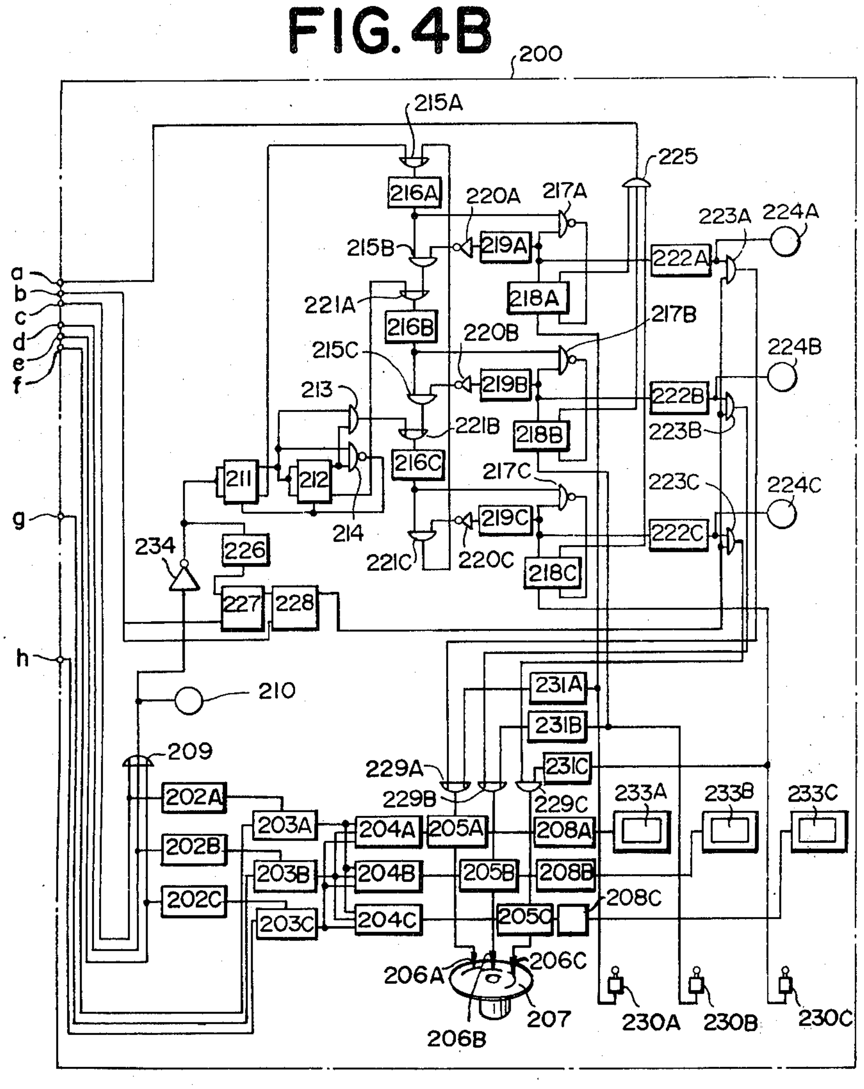

FIG. 4(A) and FIG. 4(B) are detail views of the system. The parts drawn with the thin lines in FIG. 4(A) need no explanation, since they are the same as those in FIG. 1 and marked by the same numbers. Reference numerals 201A, 201B and 201C represent alarm-switches that the observer uses when he finds suspicious baggage while watching the monitor televisions 57A, 57B, 57C. In FIG. 4(B), numerals 202A, 202B and 202C denote M.M. circuits. 203A, 203B and 203C are M.M. which are video-switches of the type which form AND circuits in analog circuits, and are used to distribute any one of the video-signals of the monitor televisions 57A, 57B, 57C. F.M. modulators are indicated by 204A, 204B and 204C. 205A, 205B and 205C are video-gates that send one-field video-signals to video-heads 206A, 206B, 206C, which are recorded on video-disk 207. When no recording is required, the video-heads reproduce the recorded signals, which produces images on the monitor televisions 233A, 233B, 233C through F.M. demodulators 208A, 208B, 208C. 209 is an OR circuit. 210 is an alarm-buzzer or an alarm-lamp that turns on when alarm-switches 201A, 201B, 201C are switched on. 234 is a NOT circuit. 211 and 212 are F.F. circuits. 213 is an OR circuit. 214 is a NAND circuit. These, which operate in a manner similar a ternary counter, distribute baggage to be inspected equally to the three inspectors. 215A, 215B and 215C are OR circuits. 216A, 216B, 216C, 219A, 219B and 219C are M.M. circuits. 217A, 217B and 217C are NAND circuits. 218A, 218B and 218C are F.F. circuits. 220A, 220B and 220C are NOT circuits. 221A, 221B and 221C are AND circuits. These circuits automatically find a free inspector. M.M. circuits 222A, 222B and 222C are excited the moment the F.F. circuits 218A, 218B, 218C are set. Their operating times are set to scan more than two fields on the monitor T.V. 223A, 223B and 223C are AND circuits. 224A, 224B and 224C are indication-lamps for the inspectors. 226 is an M.M. circuit. 227 and 228 are F.F. circuits, which generate pulse wave forms for one field. 229A, 229B and 229C are OR circuits. 230A, 230B and 230C are reset-switches that the inspectors use upon completion of the inspection. 231A, 231B and 231C are erasing-signal circuits that, as a result of the reset-switches 230A, 230B, 230C being switched on, erase the signals recorded in the video-disk 207. 225 is an AND circuit, which, when all the inspectors 45 are engaged, opens the switch 232 to stop the conveyer 10.

This embodiment, as mentioned before, includes equipment similar to that of FIG. 1. Therefore, referring now to FIG. 5, the operation of the element 200 has been heretofore described. The observer presses the alarm-switches 201A, 201B, 201C when he suspects baggage 2 whose images are given on the monitor televisions 57A, 57B, 57C. The signal sets the F.F. circuit 211 through the OR circuit 209 and the NOT circuit 234. The F.F. circuits, 211 and 212, the OR circuit 213 and the NAND circuit 214 work similarly to a ternary counter as mentioned earlier. For further details, both F.F. circuits, 211 and 212, are in the reset-state, that is, each output Q is 0 and the output $\overline{Q}$ is 1. When the alarmswitch 201 is switched on for the first time, the F.F. circuit 211 is inverted, causing the output Q to become 1 and the output $\overline{Q}$ 0. When the alarm-switch 201 is pressed for the second time, the F.F. circuit 211 is reinverted, and the output Q becomes 0 from 1. At the same time, the F.F. circuit 212 is inverted and its output Q becomes 1 and the output $\overline{Q}$ becomes 0. When the alarm-switch 201 is pressed for the third time, the F.F. circuit 211 is again inverted, causing the output Q to become 1. Simultaneously the output of NAND circuit 214, because of the output Q of F.F. circuit 212 is 1, changes to 0 from 1. At this moment, both F.F. circuits, 211 and 212, are reset with each output Q being 0. When the alarm-switch 201 is pressed for the fourth time, the F.F. circuits, 211 and 212, are set to the same state as when the alarm-switch was pressed for the first time. Then the same sequence of operation is repeated. Since the M.M. circuits 216A, 216B, 216C are excited one after another by the above-mentioned output, the output $\overline{Q}$ of the F.F. circuit 211 when the alarm-switch is pressed for the first time, the output $\overline{Q}$ of the F.F. circuit 212 for the second time and the output of the OR circuit 213 for the third time are used to select an available inspector. The counter is chosen depending on the number of inspectors. A quaternary counter is used in the case of four inspectors, a quinary counter in the case of five inspectors, and so forth.

When the alarm-switch is switched on for the first time, the M.M. circuit 216A is energized and the F.F. circuit 211 is inverted. The output Q of the F.F. circuit 211, the moment it changes from 1 to 0, energizes the M.M. circuit 216A after passing through the OR circuit 215A, and generates a pulse-signal of a fixed width. If the inspector 45A is available at this time, the output $\overline{Q}$ is 1, since the F.F. circuit 218A is reset as a result of the reset-switch 230A having been switched on. Then the pulse-signal from the M.M. circuit 216A goes to the NAND circuit 217A, the output of which puts the F.F. circuit 218A in a set-state. Therefore, the output $\overline{Q}$ of the F.F. circuit 218A is changed to 0 from 1, which at this instant drives the M.M. circuits 219A and 222A. The output signal from the M.M. circuit 219A is inverted in the NOT circuit 220A. Since the output of the NOT circuit 220A is 0 while the M.M. circuit 219A is in operation, the gate of the AND circuit 221A is closed. The pulse width of the output of the M.M. circuit 219A is set to be slightly longer than that of the M.M. circuit 216A. Since the gate of the AND circuit 221A is closed, the output signal of the M.M. circuit 216A is stopped at the AND circuit 221A. On the other hand, the M.M. circuit 222A is driven and transmits, for a fixed period, the output pulse, which opens the AND circuit 223A and turn on the indication-lamp 224A.

Such operation occurs when the reset-switch 230A is on and the inspector 45A is free. Now the case, when the inspector 45A is engaged and the reset-switch 230A is off, is described hereinafter. In this case, the F.F. circuit 218A is in a set-state and the output $\overline{Q}$ is 0. Therefore, the output signal from the M.M. circuit 216A cannot pass through the NAND circuit 217A. Since the output $\overline{Q}$ of the F.F. circuit 218A remains 0, the M.M. circuit 219A is not actuated. Since the output of the NOT circuit 220A is 1, the output signal from the M.M. circuit 216A goes through the AND circuit 221A and the OR circuit 215B and drives the M.M. circuit 216B the moment the output of the M.M. circuit 216A changes from 1 to 0. If the inspector 45B is free and the reset-switch 230B is on, the F.F. circuit 218B is reset and, since its output $\overline{Q}$ is 1, the output signal from the M.M. circuit 219B goes through the NAND circuit 217B and resets the F.F. circuit 218B. After this, as mentioned above, the M.M. circuits 219B and 222B are driven. The AND circuit 221B is closed and the output signal from the M.M. circuit 216B is blocked. Similarly, when the inspector 45B is engaged, the F.F. circuit 218C is to be set. As described above, the inspection instruction signals are automatically transmitted one after another to the position where the inspector is free. If all the inspectors are busy, the AND circuit 225 is excited, and its output becomes 1, which causes the motor 11 of the conveyer 10 to be halted with the switch 232 open.

At the same time when a free inspector is selected, the M.M. circuit 226 is driven as a result of the alarm-switch 201A having been switched on and sends out a pulse signal for a certain period. Then the F.F. circuit 227 is set the moment the output becomes 0. The F.F. circuit 227 is reset by a pulse signal from the synchronizing-signal generator 51. The F.F. circuit 228, because of being set by the signal at the time of the resetting and being reset by the pulse signal from the synchronizing-signal generator, may obtain an output pulse signal for one field. This signal is sent to the AND circuits 223A, 223B, 223C.

If the inspector 45A is available and the reset-switch 230A is on, the F.F. circuit 218A is set, and the M.M. circuit 222A is energized. Then the AND circuit 223A opens and lets the signal from the F.F. circuit 228 pass through. This signal goes through the OR circuit 229A and puts the video-gate 205A in a recording-state. Moreover, the video-signal of the image given on the monitor T.V. 57A goes through the already open video-switch 203A and then to the F.M. modulators 204A, 204B, 204C and further to the video-gates 205A, 205B, 205C. The above-mentioned video-signal, through only the video-gate 205A being in a recording-state, is given to the video-head 206A and recorded in the video-disk 207. Furthermore the video-signal is sent to the F.M. demodulator 208A and the image is displayed on the monitor T.V. 233A. When the one-field video-signal has been recorded, the F.F. circuit 228 is reset and the output of the AND circuit 223A disappears. Then the video-gate 205A puts the video-head 206A in a regenerative state starting with the next field. The recorded signal is regenerated by the video-head 206A and the regenerated output is provided to the monitor T.V. 233A through the F.M. demodulator 208A. The recorded one-field signals are repeatedly supplied to the monitor T.V. and the X-ray image of the suspicious baggage may be continuously given.

When the inspector 45A is engaged and the others are not, in an operation similar to that mentioned earlier, the M.M. circuit 222B is energized and the AND circuit 223B opens. Then the output-signal of the F.F. circuit 228 goes through the AND circuit 223B and the OR circuit 229B, and switches the video-gate 205B to a recording-state. Therefore, the video-signal in the F.M. modulator 204B goes through the video-gate 205B and is recorded in the second track in the video-disk 207 through the video-head 206B. Simultaneously this video-signal passes through the F.M. demodulator 209B and the image is displayed on the monitor T.V. 233B. After one-field recording has been made in the video-disk, the video-gate 205B puts the video-head 206B in a regenerative state, resulting in the regeneration of the recorded signal. The regenerated signal displays the images starting with the next field on the monitor T.V. 233B through the F.M. demodulator 208B. If inspectors 45A and 45B, are engaged, and the inspector 45C is free, the above-mentioned series of operations takes place, and the X-ray image of the suspicious baggage is provided on the monitor T.V. 233C for the inspector 45C.

After inspection, each inspector turns on his reset-switch. As a result, the F.F. circuits 218A, 218B, 218C are reset, and the signal erasing circuits 231A, 231B, 231C are operated. The erasing signals go through the OR circuits 229A, 229B, 229C and put the video-gates 205A, 205B, 205C in a recording-state. However, since the video-switches 203A, 203B, 203C are closed, signals erase the recordings in the video-disk 207 through the video-heads 206A, 206B, 206C.

When the alarm-switch is turned on for the second time, the F.F. circuit 212 is reset and its output $\overline{Q}$ goes through the OR circuit 215B and actuates the M.M. circuit 216B. As a result the above-mentioned series of operations takes place, and the X-ray image is given on the monitor T.V. 233B, whenever the inspector 45B is free. If the inspector 45B is engaged and the inspector 45C is available, the X-ray image is given on the monitor T.V. 233C for the inspector 45C.

It can be easily understood from the foregoing description that when the observer selects any one of the alarm-switches 201A, 201B, 201C, any one of the images on the corresponding monitor T.V. 57A, 57B, 57C can be arbitrarily given on any one of the monitor televisions 233A, 233B, 233C.

Figures 6B, 11:
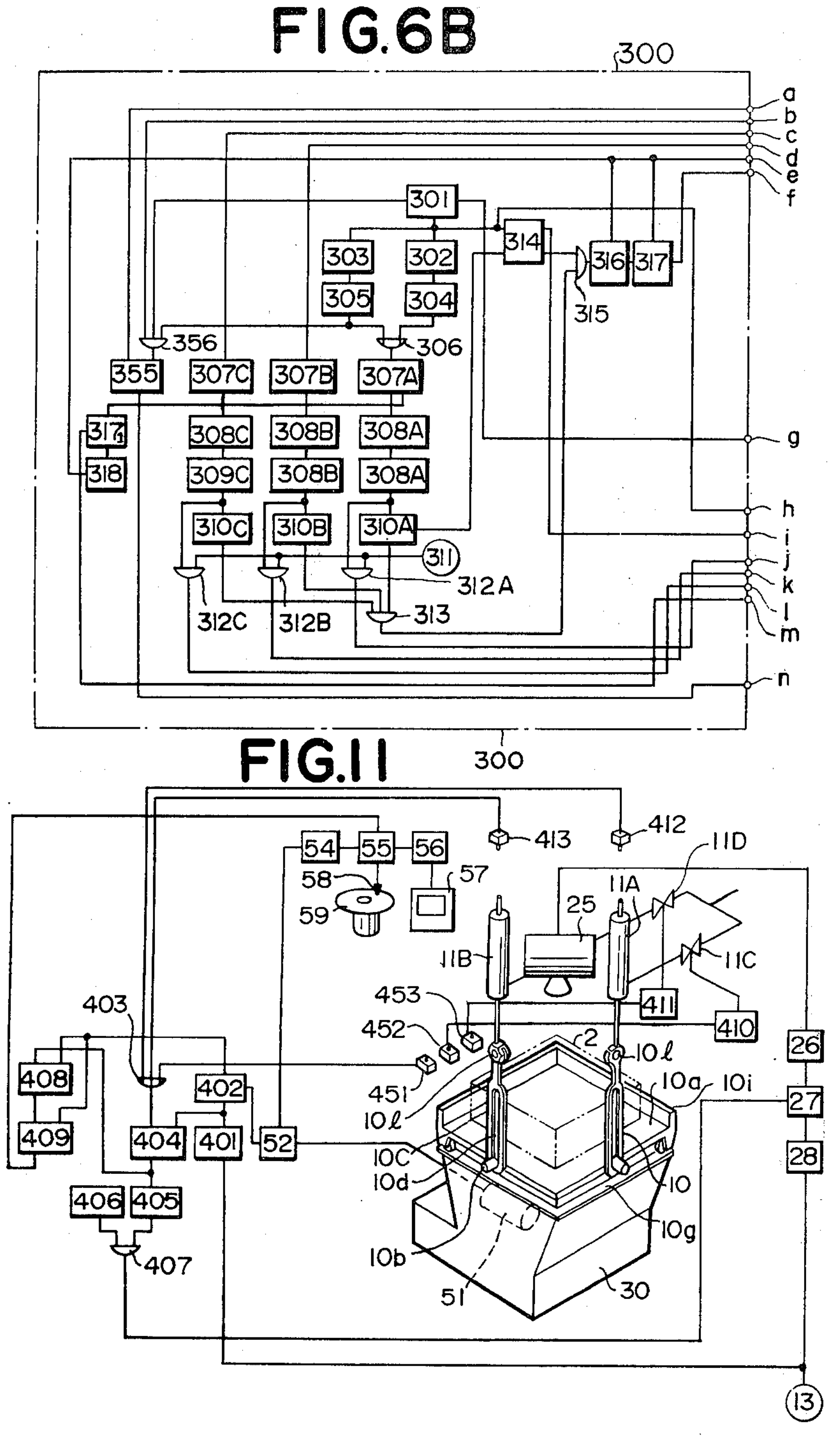
FIG. 11 and FIG. 12 show another embodiment of the X-ray inspection apparatus of the present invention.
Figure 7:
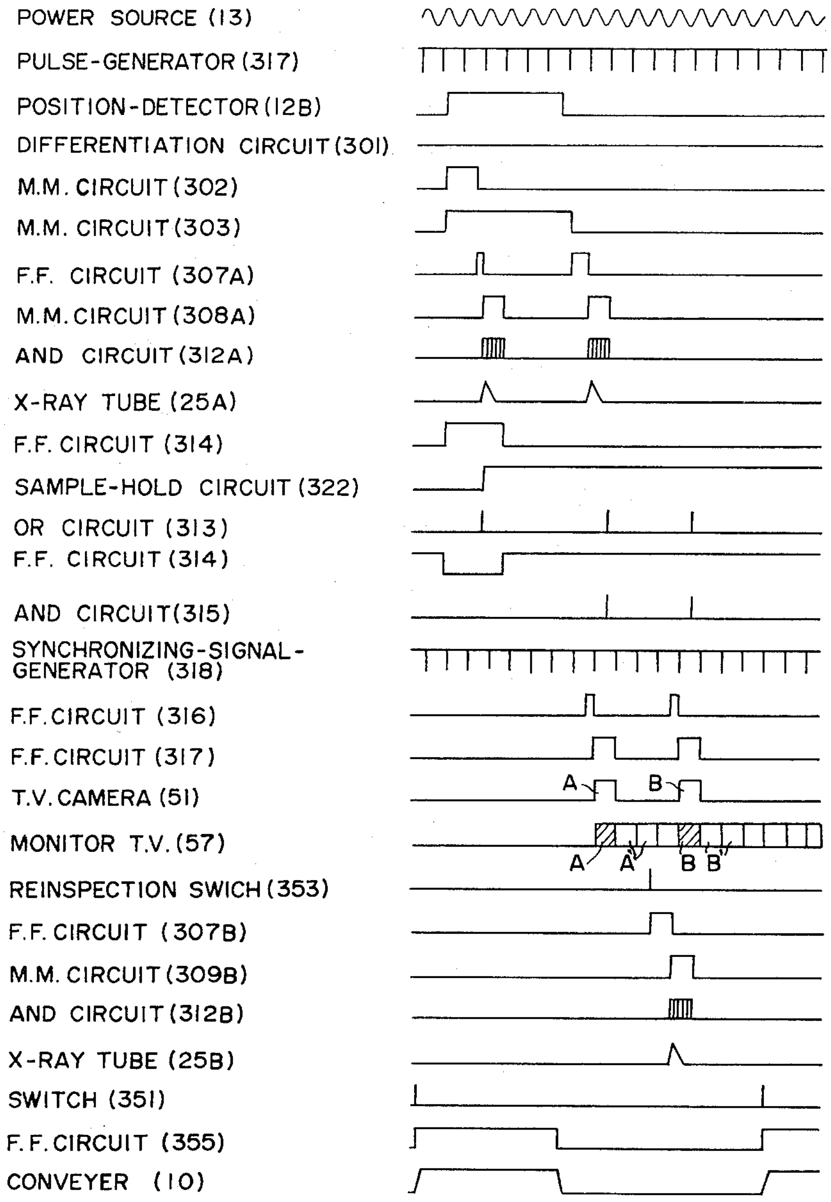

FIG. 6(A) and FIG. 6(B) show another arrangement of the X-ray inspection equipment of the present invention. Three X-ray tubes are arranged normal to the direction of the movement of the object. Each X-ray tube irradiates a different part of the object and, as a result, the object under suspicion can be inspected in three directions.

Figure 10:
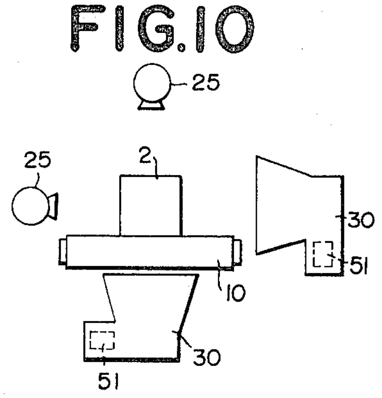
FIG. 10 is a schematic illustration indicating another arrangement of the X-ray tube and a fluoroscope in the X-ray inspection equipment of the present invention.

In FIG. 6(A), 10 is a conveyer that transports the object 2 in the direction of the arrow, and is driven by the motor 11 through the clutch 11'. This clutch, like an electro-magnetic clutch, can optionally transmit or cut off the power of the motor to the conveyer. The dark-box 30 is placed under the conveyer and contains a fluoroscope (not shown in the figure) facing the X-ray tubes 25A, 25B, 25C and the T.V. camera 51 which photographs the X-ray image formed on the fluoroscope. The X-ray tubes 25A, 25B, 25C, as mentioned before, are located above the conveyer 10, facing the fluoroscope. The three X-ray tubes are placed, each being directed in different directions from one another, in a straight line normal to the direction of travel of the object 2, and are so placed that the X-ray images by the three X-ray tubes can be formed on the single fluoroscope. Thus, when the object 2 comes under the X-ray tubes, the X-ray tube 25A forms an X-ray image of the object 2 taken from the top on the fluoroscope. The X-ray tubes 25B and 25C separately form images taken sideways from both sides on the fluoroscope. These X-ray tubes are connected to the high-voltage transformers 26A, 26B, 26C and to the switch-circuits 27A, 27B, 27C using thyristors, which are further connected to the power source 13 through the autotransformer 28 with taps.

The position-detector comprises the projector 12A and the receiver 12B, each arranged on either opposite sides of the conveyer 10, and starts the control device 300 by a signal sent out from the receiver 12B when a beam from the projector 12A to the receiver 12B is blocked by the object 2.

FIG. 6(B) is a detailed view of the control device. 301 is a differentiation circuit having terminals that send out an output signal in response to a rise and a fall signal. 302 and 303 are M.M. circuits. 304 and 305 are differentiation circuits that produce an output in answer to a fall signal. 306 is an OR circuit. 307A, 307B and 307C are F.F. circuits. 308A, 308B and 308C are differentiation circuits that produce an output in answer to a fall signal. 309A, 309B and 309C are M.M. circuits. 310A, 310B and 310C are differentiation circuits, and 310A produces an output in response to a fall and a rise signal. 311 is an oscillator. 312A, 312B and 312C are AND circuits. 313 is an OR circuit. 314 is an F.F. circuit. 315 is an AND circuit. 316 and 317 are F.F. circuits. 317 is a pulse-generator that develops an output by detecting the voltage-phase of the power source 13. 318 is a synchronizing-signal generator. 320 is an X-ray detector placed near the dark-box 30 and produces an output depending on the X-ray level given by X-ray tube 25A. 321 is an analog-gate. 322 is a sample-hold circuit that stores the maximum output from the analog-gate and continuously transmits an output thereafter. 323 is a tap-selecting circuit for the transformer 28 with taps in the X-ray generating unit, and it selects a tap according to the output from the X-ray detector. 351–354 are push-button switches. The push-button switch 351 is used to connect the clutch 11' to transfer the object 2 when the inspection is used completed. 352 i to stop the conveyer 10 at an arbitrary place to inspect an optional portion of a long object. 353 and 354 are push-button switches for reinspection. 355 is an F.F. circuit. 356 is an OR circuit. 357 is a control circuit for the clutch 11'.

The T.V. camera 51 in the dark-box 30 is connected to the camera-controller 52 and finally to the monitor T.V. 57 through the F.M. modulator 54, the video-gate 55 and the F.M. demodulator 56. The video-gate 55 is connected to the F.F. circuit 317, and controlled by the output from the F.F. circuit 317. As a result, the video-gate 55 records the one-field video-signal from the T.V. camera 51 in the video-disk 59 through the video-head 58. When there is output from the F.F. circuit 317, the signal recorded in the video-disk 59 is regenerated by the video-head 58 and the image is displayed on the monitor T.V. 57.

In the above-mentioned equipment, the conveyer 10 is driven by connecting the clutch 11'. When the object 2 is put on the conveyer, a beam from the projector 12A to the receiver 12B is blocked by the object 2 and the receiver 12B produces an output signal. This output is supplied to the differentiation circuit 301 in the control device 300. Then the differentiation circuit 301, in response to the rise signal of this output, actuates the M.M. circuits 302 and 303. 314 is set to generate the output from one of the terminals, causing the analog-gate 321 to open. After the M.M. circuit 302 operates for a present time, the output becomes 0, and then the differentiation circuit 304 transmits the output produced by the fall signal. Moreover the output from the differentiation circuit 304 sets the F.F. circuit 307A through the OR circuit 306. The F.F. circuit 307A, after being set, is reset by the first signal from the pulse generator 317. The differentiation circuit 308A transmits the output produced by the fall output to actuate the M.M. circuit 310A, which, as a result, produces an output signal for a certain period. The output from the M.M. circuit 310A, along with the output from the oscillator 311, is supplied to the AND circuit 312A to obtain the output from the AND circuit 312A in accordance with the pulse from the oscillator 311. This output closes the switch circuit 27A by igniting the thyristor in the switch circuit 27A, and drives the X-ray tube 25A through the high-voltage transformer 26A. Thus the X-ray tube 25A produces X-rays in the form of pulse.

Throughout the X-ray irradiation, since the receiver 12B generates the output, the conveyer 10 is continuously driven, and the object 2 is transported to a position where is under the X-ray tubes after passing between the projector 12A and the receiver 12B. The rays generated by the X-ray tube 25A penetrates the object 2 and reach the X-ray detector 320. The X-ray detector produces an output proportional to the X-ray penetration level. This output goes through the analog-gate 321 and is given to the sample-hold circuit 322 which stores its maximum value and continuously generates the output of the stored value thereafter. The output from the sample-hold circuit energizes the tap-selecting circuit 323, which enables the X-ray tubes to give optimum X-ray irradiation by selecting a higher output voltage tap in the transformer when the output of the X-ray detector is low, and conversely by selecting a lower output voltage tap when the output of the detector is high. After the object 2 has passed between the projector 12A and the receiver 12B, the output from the receiver 12B ceases. Thereby the output from one of the terminals of the differentiation circuit 301 is intitiated to set the F.F. circuit 355 through the OR circuit 356. At this time, the output of the F.F. circuit becomes is attached to 0, which actuates the clutch-control circuit 357 to disconnect the clutch 11', resulting in halting the conveyer 10.

On the other hand, a fixed time after the output is produced by the receiver 12B, the output of the M.M. circuit 303 is lost, and the differentiation circuit 305 thereafter produces the output. The output from the differentiation circuit 305 sets the F.F. circuit 307A through the OR circuit 306, and, as in the case when the differentiation circuit 304 sends out the output, the AND circuit 312A produces an output to close the switch circuit 27A, causing the X-ray tube 25A to radiate X-rays in the form of pulse under the condition set by the X-ray detector 320. At the termination of the prior radiation, which is a preliminary radiation to determine the X-ray radiation condition, the output signal is produced at one of the terminals of the differentiation circuit 308A to reset the F.F. circuit 314. Therefore the output is induced at one of the terminals of the F.F. circuit 314 and it may be transferred to one of the terminals of the AND circuit 315. When the differentiation circuit 310A develops an output signal, the output energizes the AND circuit 316 through the OR circuit 314 to set the F.F. circuit 316. The F.F. circuit 316, after being set, is reset by the first signal from the synchronizing-signal generator 318. The fall output sets the F.F. circuit 317 whose output switches the video-gate 55 into a recording-state. Accordingly the video-signals of the X-ray image of the object 2 sent from the T.V. camera 51 at the second X-ray irradiation are recorded for one field in the video-disk 58 through the video-head 59. After the video-signals for one field are recorded, the output from the synchronizing-signal generator 318 resets the F.F. circuit 317 to restore its video-gate 55 to the initial state. Simultaneously the signal recorded in the video-disk 59 is regenerated from the video-head 58, and the regenerated signal is transmitted to the monitor T.V. 57 through the F.M. demodulator 56. Therefore the images of the object 2, which is statically obtained on the monitor T.V. 57, allow the investigator to reach a conclusion on object. After the said judgement, the F.F. circuit 355 is reset by pressing the push-button switch 351. The output of the F.F. circuit 355 energizes the clutch-control circuit 357 to connect the clutch 11', causing the conveyor 10 to carry the object 2 away. The series of operations is now completed.

In case sufficient inspection cannot be made by the images given on the monitor T.V. 57, push-button switch 353 is pressed for reinspection to set the F.F. circuit 307B. The F.F. circuit 307B, after being set, is reset by the first signal from the pulse generator 317$_1$. The differentiation circuit 308B generates an output in response to the fall output at this resetting in order to activate the M.M. circuit 310B which, as a result, develops an output for a fixed period. Hereinafter, similarly to the regular irradiation by the X-ray tube 25A, the switch circuit 27B is closed to activate the X-ray tube 25B. The X-ray tube 25B then irradiates the object 2 from the side to obtain the image taken from sideways on the fluoroscope. The T.V. camera 51 photographs the present image whose video-signal for one field is recorded in the video-disk 59, and finally the image is displayed on the monitor T.V. 57.

If the inspection is satisfactorily completed, the object 2 is discharged by pressing the push-button switch 351, preparing for the next inspection. Otherwise, press the reinspection push-button switch 353 is pressed to energize the X-ray tube 25C so that an additional image, taken at a different angle, appears on the monitor T.V. 57. As a result, inspection may be made using images taken in three different directions.

Figure 8A:
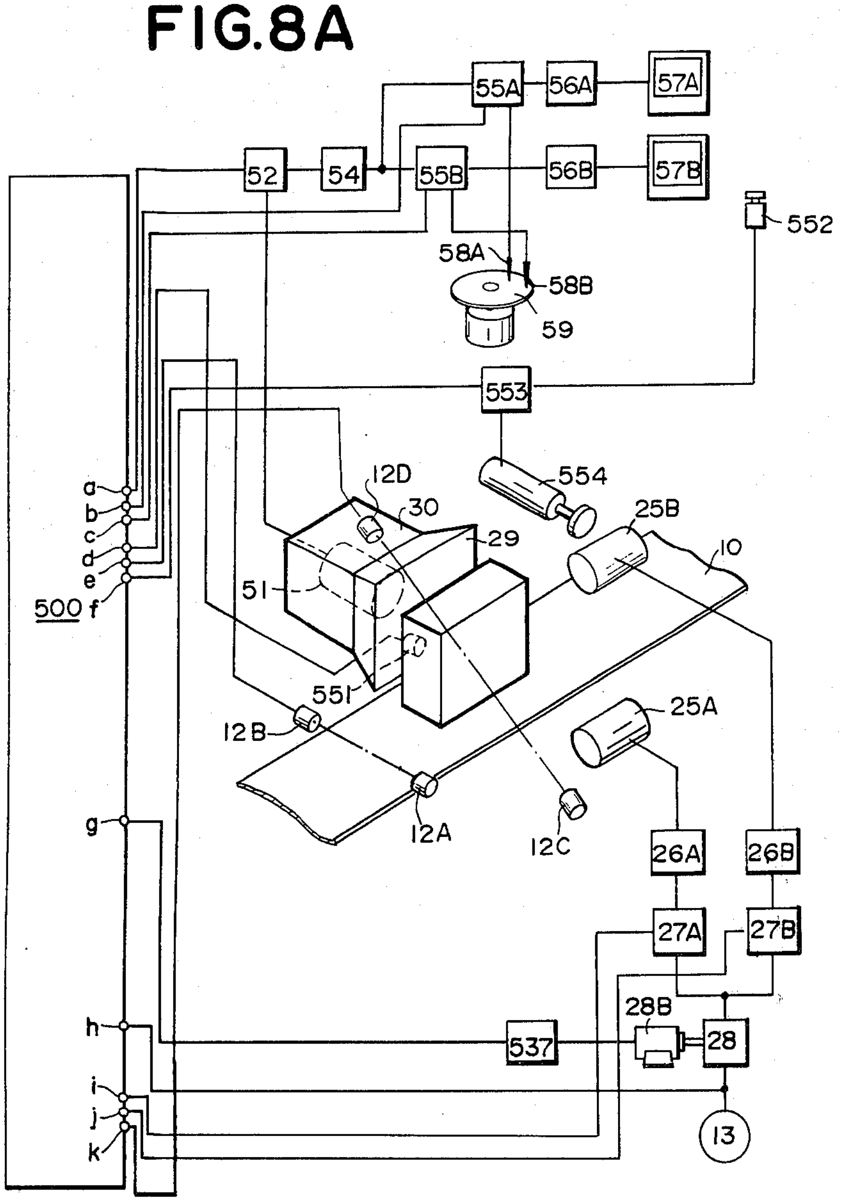
FIG. 8(A), FIG. 8(B) and FIG. 9 show another embodiment of the X-ray inspection apparatus of the present invention.
Figure 8B:
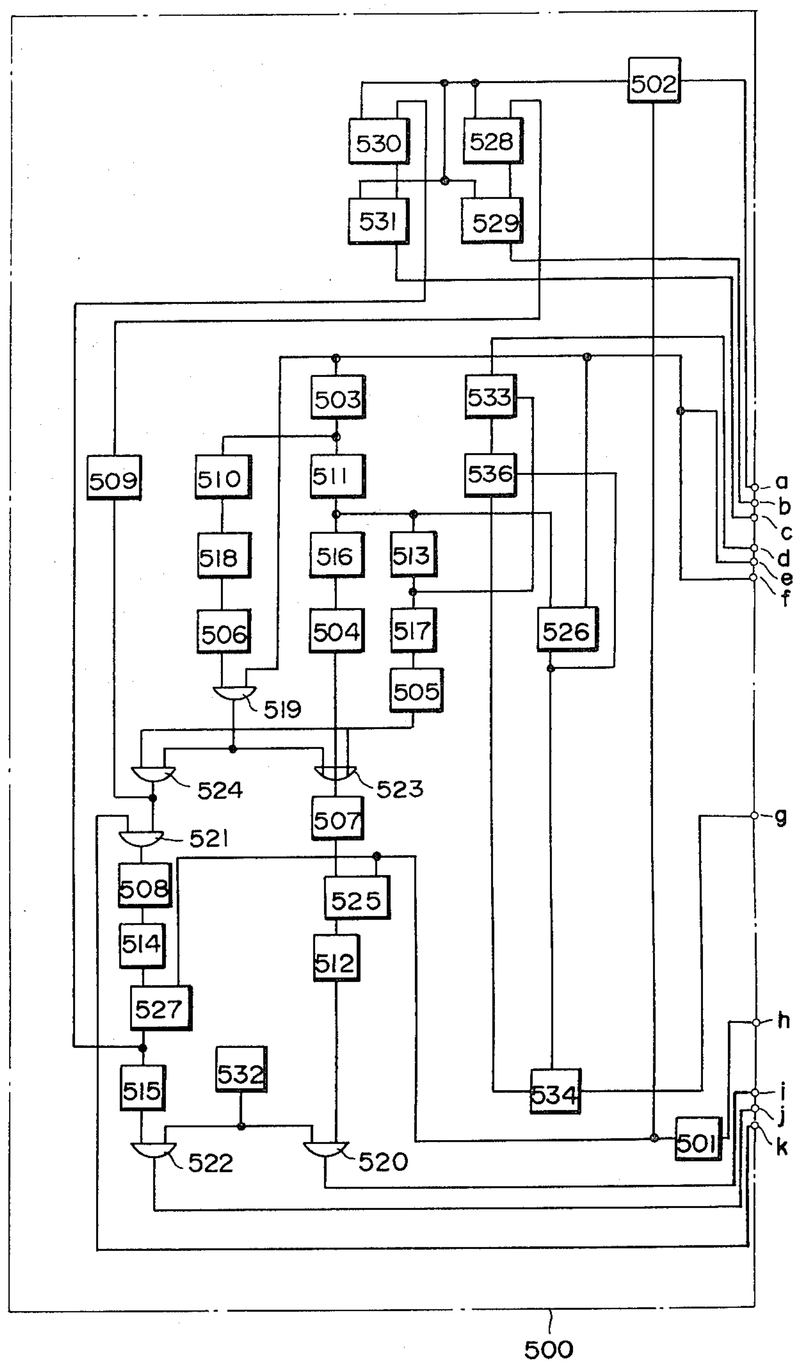
Figure 9:
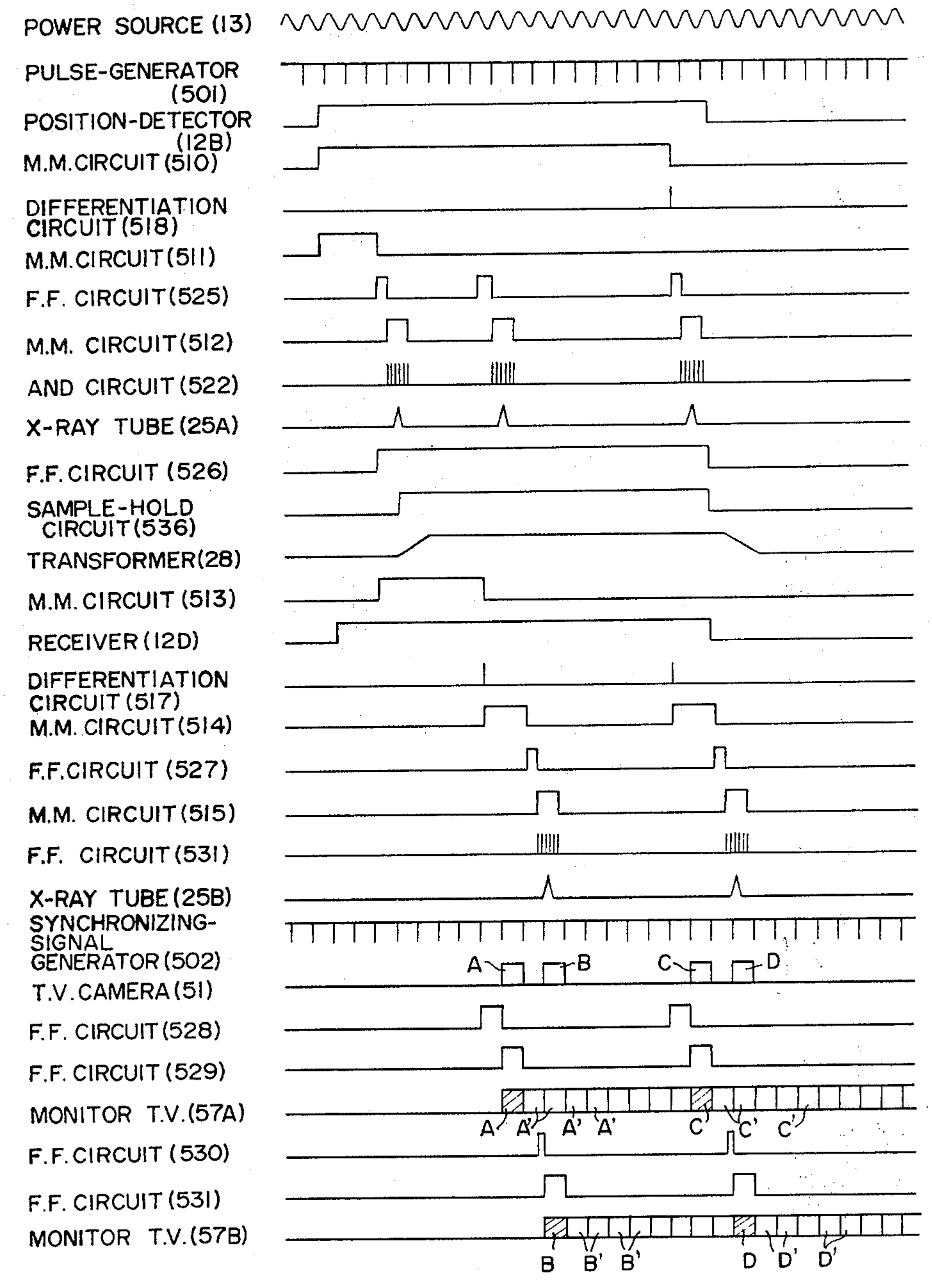

FIGS. 8(A), 8(B) and FIG. 9 show another embodiment of the X-ray inspection equipment of the present invention. This apparatus provides an additional X-ray image of the object taken from another direction when the size of the object is larger than that previously set.

In the figure, 10 is a conveyor having an endless belt engaged on two rolls. Only part of the belt is shown in the figure. An X-ray tube 25A is placed alongside the conveyor. A fluoroscope 29 contained in a dark-box 30 is arranged to face the X-ray tube on the opposite side of the conveyor. An additional X-ray tube 25B is placed facing fluoroscope 29 and at a predetermined angle to the X-ray tube 25A, the X-ray images of the object 2 produced by each X-ray tube being formed on the fluoroscope 29.

Each X-ray tube is connected to an autotransformer 28 through high-voltage transformers, 26A and 26B, and switch circuits 27A and 27B respectively. The above autotransformers are connected to the power source 13. These elements compose an X-ray generating unit.

In the dark-box 30 is installed a T.V. camera 51 that photographs the X-ray image formed on the fluoroscope 29 and that converts the image into a video-signal. The T.V. camera is connected to the monitor televisions 57A, 57B through the camera controller 52, F.M. modulator 54, video-gates 55A, 55B and F.M. demodulators 56A, 56B. The video-gates are connected to the video-recorder having a video-head 58 and video-disk 59.

Two sets of position-detectors are installed, each comprising a projector and a receiver. Each receiver sends out a signal when a beam from the projector to the receiver is blocked. One of the two sets actuates this equipment when the object 2 reaches a first location. The projector 12A and the receiver 12B are placed perpendicular to the direction of movement of the object 2. The other set of position-detector is used to energize the X-ray tube 25B when the object exceeds the penetration ability of the X-ray tube 25A. The projector 12C and the receiver 12D are arranged so that the beam from the projector 12C to the receiver 12D passes outside the above-mentioned penetration scope.

The control device 500 is shown in FIG. 8(B). In the figure, 501 is a pulse generator. 502 is a synchronizing-signal generator. 503–509 are reversible inverter circuits 510–515 are M.M. circuits. 516–518 are differentiation circuits. 519–522 are AND circuits. 523 and 524 are OR circuits. 525–531 are F.F. circuits. 532 is a thyristor-gate pulse generating circuit. 533 and 534 are analog-gate circuits. 536 is a sample-hold circuit. 537 is a driving circuit of a motor 28B which shifts the sliding piece of the autotransformer.

In addition, in the present inspection system, an X-ray detector 551 is installed facing the X-ray tube 25A. The output of this X-ray detector goes to the control device and drives the motor 28B, which in turn adjusts the autotransformer 28.

The operations of this X-ray inspection apparatus is described hereinafter. When the object 2 passes through the position-detector by means of conveyer 10, a beam from the projector 12A to the receiver 12B is blocked and the receiver generates a signal. This signal is inverted by the inverter circuit 503, and the output of the inverter circuit 503 drives the M.M. circuit 511. The output of the M.M. circuit 511 is inverted by the inverter circuit 504 after passing through the differentiation circuit 516, and in turn goes through the OR circuit 523. Then it is reinverted by the inverter circuit 507 and sets the F.F. circuit 525. On the other hand, the pulse generator 501 resets the F.F. circuit 525 to activate the M.M. circuit 512, the moment the output of the F.F. circuit becomes 0. The output of the M.M. circuit 512 becomes another input of the AND circuit 520, and the AND circuit 520 produces an output only when the M.M. circuit 512 is in operation. In order to let this output pass through the switch circuit 27A, the output voltage of the autotransformer 28 is provided to the high-voltage transformer 26A, and the X-ray tube 25A radiates a pulse-form X-rays only during the set-time of the M.M. circuit 512.

This X-ray penetrates the object 2 and goes into the X-ray detector 551. At this time, the detector 551 generates an output proportional to the X-ray irradiation level, and this output is transferred to one of the terminals of the analog-gate circuit 533. To the other terminal of the analog-gate circuit 533 the output of the M.M. circuit 513 induced by the output of the M.M. circuit 511 is fed. The output of the X-ray detector 551 can go through the analog-gate circuit 533 when the output of the M.M. circuit 513 is 1. The output, after passing through the analog-gate circuit 533, goes into the sample-hold circuit 536, which in turn stores a voltage proportional to the output of the X-ray detector 551. This voltage becomes the input to one of the terminals of the analog-gate 534. To the other terminal of the analog-gate 534, the output generated during resetting responsive to the termination-signal from the receiver 12B of the position-detector is provided, since the F.F. circuit 526 has been already set by the output of the M.M. circuit 511. The analog-gate circuit 534 lets the output of the sample-hold circuit 536 pass through when the output of the F.F. circuit 526 is 1, and then transfers it into the driving circuit 537 for the motor 28B. The driving circuit 537 controls the motor 28B and changes the output of the autotransformer 28 according to the output voltage of the sample-hold circuit 536. When the X-ray have to transverse a thick object the X-ray irradiation level received by the X-ray detector 551 is low, and the output voltage of the sample-hold circuit 536 becomes low and the driving circuit 537 drives the motor 28B in such a direction that the output voltage of the autotransformer 28 increases. When the X-ray penetrating thickness of the object is small, that is, the X-ray irradiation level received by the X-ray detector 551 is high, the driving circuit drives the motor in such a way that the output voltage of the autotransformer decreases. Thus the optimum condition for the next regular X-ray irradiation may be established.

Independently of the operations mentioned above, the output of the M.M. circuit 513 sets the F.F. circuit 525, after being differentiated in the differentiation circuit 517, inverted by the inverter circuit 505, passed through the OR circuit 523 and reinverted by the inverter circuit 507. By this time, the object 2 has been carried to the fluoroscope. The F.F. circuit 525, after being set, is reset by the first signal from the pulse generator 501. The output produced at the time of this resetting goes through the M.M. circuit 512 and the AND circuit 520 and then is used to turn on the switch circuit 26A. Furthermore, similarly to the preliminary X-ray irradiation mentioned before, the X-ray tube 25A radiates a pulse-form X-ray. Here the X-ray is irradiated under the condition established by the preliminary irradiation.

The X-ray image of the object 2 produced on the fluoroscope 29 is photographed by the T.V. camera 51 and converted into a video-signal. The video-signal, after passing through the camera controller 52, the F.M. modulator 54 and the video-gate 55, is recorded in the video-recorded for one field. At the same time, it goes through the F.M. demodulator 56 and its image is displayed on the monitor T.V. 57. After one field recording is completed, the video-gate is changed over by the control device 500 and from the next field the image generated from the video-signal is displayed on the monitor T.V. at the field cycle.

For further details, the foregoing output of the M.M. circuit 513 goes through the differentiation circuit 517, the inverter circuit 505 and the OR circuit 524, and in turn sets the F.F. circuit 528. The F.F. circuit 528, after being set, is reset by the first signal from the synchronizing-signal generator 502. The F.F. circuit 529 is set when the output signal of the F.F. circuit 528 becomes 0, and it is also reset by the synchronizing-signal generator 502. Thus, a one-field gate-pulse signal may be obtained from the F.F. circuit 529. This gate-pulse signal actuates the video-gate 55A. The video-signal from the T.V. camera 51 goes through the video-gate 55A and is recorded in the video-disk 59 through the video-head 58A, and it further goes through the F.M. demodulator 56A to display the image on the monitor T.V. 57A. After one-field video-signal has been recorded in the video-disk, the video-gate 55A shuts off the signal from the modulator 54, and starting from the next field the recorded signal regenerated through the video-head 58A is provided to the monitor T.V. 57A through the F.M. demodulator 56A at the field cycle. Accordingly the static image of the object 2 is shown on the monitor T.V. After the object 2 has passed away, the next object 2 energizes the position-detector and the preceding series of operations is now repeated.

In the present X-ray inspection system, when the object 2 is too large to be covered by the X-ray tube 25A, the X-ray tube 25B starts inspecting the extended portion of the object 2. In other words, when the object 2 is higher than the inspection scope, the beam from the projector 12C to the receiver 12D is blocked and the receiver produces an output, which is transferred to the AND circuit 521. As a result, the output of the OR circuit 524 which was already given to the other terminal of the AND circuit 521 goes through the AND circuit 521, and is then inverted by the inverter circuit 508 to energize the M.M. circuit 514 and set the F.F. circuit 527. The F.F. circuit 527, after being set, is reset by the first signal from the pulse generator 501, and actuates the M.M. circuit 515 the moment it is reset. The output of the M.M. circuit 515 is transferred to the AND circuit 522, which lets the signal from the thyristor-gate-pulse generator 532 pass through and ignite the thyristor in the switch circuit 27B. At this time the X-ray tube 25B generates a pulse-form X-ray. This X-ray radiation forms an X-ray image of the extended portion of the object 2 on the fluoroscope 24. It is recommended that the X-ray generating phase of the X-ray tube 25B be different from that of the X-ray tube 25A to minimize deleterious effects caused by the scattered X-rays.

The image of the object 2 produced on the fluoroscope 29 by the X-ray tube 25B is photographed by the T.V. camera 51. The one-field video-signal produced by the T.V. camera is transmitted to the F.M. modulator 54 through the camera controller 52. Simultaneously the F.F. circuit 515 and the F.F. circuit 531 are actuated as mentioned above, and the output of the F.F. circuit 531 causes the video-gate 55B to record the one-field video-signal from the F.M. modulator 54 in the second channel of the video-disk 59 through the video-head 58B. Furthermore this one-field video-signal is transmitted to the F.M. demodulator 56B to obtain image B on the monitor T.V. 56B. After the one-field signal has been recorded, the F.F. circuit 531 causes the video-gate 55B to regenerate the recorded video-signal through the video-head 58B. The regenerated cycle signal is further transmitted to the monitor T.V. 57B at the field cycle through the video-gate 55B and the F.M. demodulator 56B to obtain the image B' thereon. Thus the static image of the object 2 by the X-ray tube 25B may be achieved on the monitor T.V. 56B.

If the image displayed on the monitor T.V. 57A or the monitor T.V. 57B shows a weapon in the object 2, the object-removal switch 552 is pressed to actuate the removing circuit 553. As a result, the remover 554 starts removing the object 2 from the conveyor 10. When no weapon appears, the object 2 is carried away by the conveyor 10. Thereafter when the next object activates the position-detector, the series of operations starts again.

As mentioned above, in the X-ray inspection system of the present invention, a plurality of X-ray tubes are arranged above or alongside the object and both X-ray tubes create an X-ray image on one fluoroscope. However, there is another embodiment, as shown in FIG. 10, wherein two X-ray tubes 25 are respectively arranged above and on the side of the object, each facing its own fluoroscope. Each fluoroscope is contained in a separate dark-box 30 having a T.V. camera.

Figure 12:
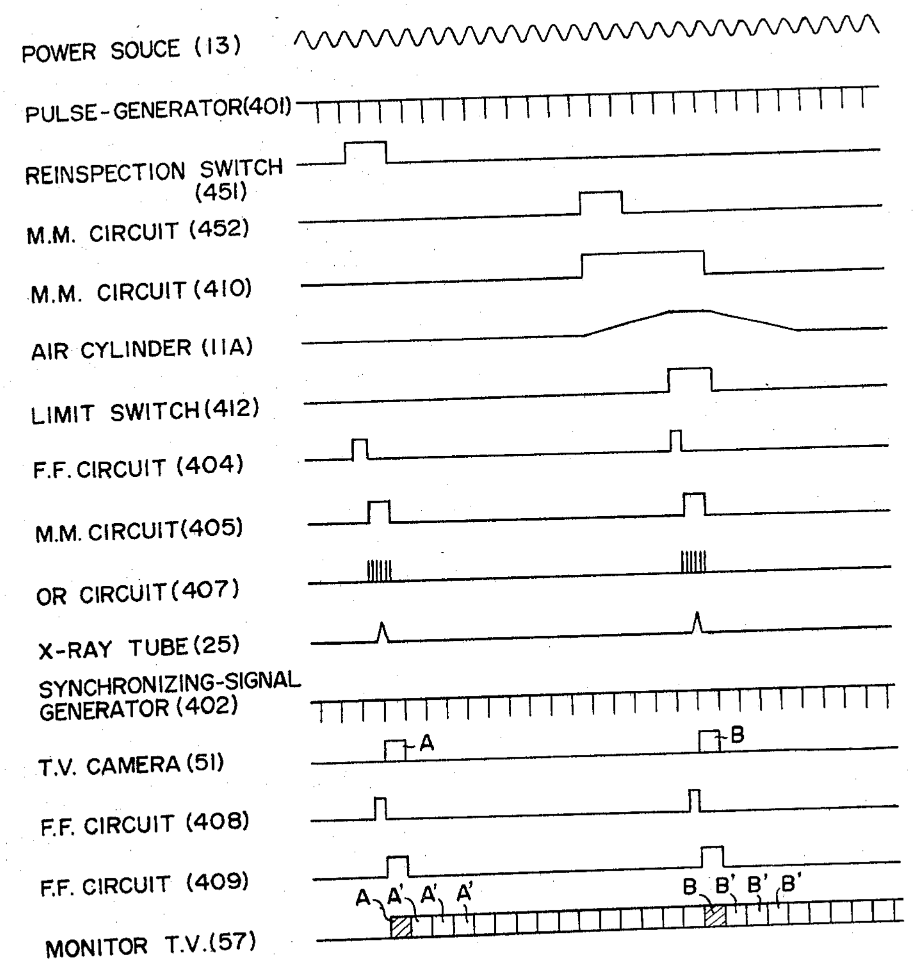

In the above-mentioned X-ray inspection equipment of the present invention, the object is continuously moved by the conveyer and the images taken from various directions by a plurality of X-ray tubes can be obtained. However, images taken from various directions can be obtained with only one X-ray tube by changing the position of the object. FIG. 11 and FIG. 12 show an embodiment of such an X-ray inspection equipment.

The inspection desk 10 on which the object is put has a square stand 10*a*. On the adjoining sides of the stand, pins 10*b* are provided which are inserted in the holes 10*d* of the levers 10*c*. The other end of each lever is connected to air cylinders 11*a*, 11*b* through the bearings 10*e*. These air cylinders maintain the stand 10*a* horizontally on rail 10*g* mounted in the dark-box 30. By operating each air cylinder, the stand 10*a* is controlled so that the one side thereof ascends and as a result the other side descends. On the base of the stand is provided rollers to facilitate the sliding motion of the stand on the inspection desk. Moreover on the top of the stand are provided walls 10*i* to prevent the object 2 from falling down.

The X-ray tube 25 is arranged right above the stand 10*a*, facing the fluoroscope in the dark-box. The X-ray tube is connected to the power source 13 through the high-voltage transformer 26, the switch circuit 27 and the autotransformer 28. The X-ray generating unit comprising these elements causes the X-ray tube to radiate and produce the X-ray image of the object 2 on the fluoroscope.

In the dark-box 30 is placed the T.V. camera 51 that photographs the X-ray image on the fluoroscope and converts it into a video-signal. The T.V. camera is connected to the monitor T.V. 57 through the camera controller 52, the F.M. demodulator 54, the video-gate 55 and the F.M. demodulator 56. Furthermore the video-gate is connected to the video-recorder. Thus the video-signal is not only turned into the image on the monitor T.V., but also recorded in the video-recorder. The video-recorder has a video-head 58 and a video-disk 59. The video-head is connected to the video-gate 55. The video-gate, in accordance with the instruction from the control device, transmits the video-signal received from the T.V. camera to the head 58 for one field. The video-signal is further recorded on the video-disk 59. The field thereafter regenerates the recorded signal and transmits it to the monitor T.V. 57.

The control device comprises the pulse generator 401 that is connected to the power source 13 to detect the voltage phase of the power source 13 and to generate pulses, the synchronizing-signal generator 402, the OR circuit 403, the F.F. circuit 404, the M.M. circuit 405, the oscillator 406, the AND circuit 407 and the F.F. circuits 408, 409. Furthermore the M.M. circuits, 410 and 411, that control the opening and shutting of the control valves 11*c*, 11*d* and the limit switches, 412 and 413, for the air cylinders are included in the control device.

The control device performs the following series of operations when the inspection switch 451 and the reinspection switches 452, 453 are pressed by the observer.

When the inspection switch 451 is pressed, after the object 2 is placed on the stand 10*a*, the OR circuit 403 produces an output signal which sets the F.F. circuit 404. The F.F. circuit 404, after being set, is reset by the signal from the pulse generator 401 when the voltage of the power source 13 becomes 0. The M.M. circuit 405 is energized by the fall output at this resetting. As a result, the AND circuit 407 causes the oscillator 406 to generate the output only during the set-time of the M.M. circuit 405. The output of the AND circuit 407 ignites the thyristor in the switch circuit 27 and the X-ray tube 25 further radiates X-rays only during the set-time of the M.M. circuit 405.

The X-rays penetrate the object 2 and form an X-ray image of the object 2 on the fluoroscope in the dark-box 30. The T.V. camera 51 photographs the image on the fluoroscope and converts it into a video-signal. This signal is transmitted to the monitor T.V. 57 through the camera controller 52, the F.M. modulator 54, the video-gate 55 and the F.M. demodulator 56, resulting in the reappearance of the image on the monitor T.V. 57.

On the other hand, the fall signal when the F.F. circuit 405 is reset sets the F.F. circuit 409. The output of the F.F. circuit 409 controls the video-gate 55 to provide the video-signal received from the T.V. camera 51 to the head 58 and to record it on the disk 59. After one-field video-signal has been recorded, the signal from the synchronizing-signal generator 402 resets the F.F. circuit 409. At this time the output of the F.F. circuit 409 is switched to 0 and the signal to the video-gate 55 disappears. As a result, the head 58 regenerates the signal already recorded in the disk 59, and the regenerated signal is transferred to the monitor T.V. 57 through the demodulator 56. Then the monitor T.V. displays the image caused by the regenerated signal from the next field. Thus the X-ray image of the object 2 may be statically displayed on the monitor T.V. 57. If the sufficient inspection is achieved by only this static image, the object 2 is unloaded and the next object is mounted on the stand. When pressing the inspection switch 451, the preceding operation is repeated.

If the image displayed when the stand 10*a* is horizontal is insufficient to perform the inspection, the reinspection switch 452 is pressed, leaving the object 2 on the stand 10*a*. Thereby the M.M. circuit 410 is energized, the output of which operates electro-magnetic valve 11*c*. Then the compressed air is introduced into the air cylinder 118A, which lifts and inclines stand 10*a*. When the stand is inclined at a fixed angle by the air cylinder, the rod in the air cylinder actuates the limit switch 412 to produce the output from the OR circuit 403. Furthermore in the same manner as the initial operations when the switch 451 was pressed, the video-disk 59 records the video-signal for one field, and at the same time the image of the inclined object 2 is transmitted to the monitor T.V. 57. The monitor T.V. displays the image of the recorded signal from the next field. Upon completing these operations, the output of the M.M. circuit 410 terminates, and the electro-magnetic valve 11*c* and the air cylinder 11*a* are restored to their initial positions.

If the inspection is still unsatisfactory, the reinspection switch 453 is pressed to actuate the air cylinder 11b so that the object 2 is further inclined in a different direction. It can be readily understood that the static image of this inclined object is displayed on the monitor T.V. 57.

Figure 13:
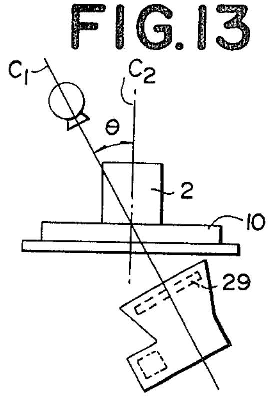
FIG. 13 is a schematic illustration indicating another embodiment of the X-ray inspection apparatus of the present invention, in which only an X-ray tube, object, turntable thereof and a dark-box are shown.

Moreover another method of inspection is to place the object 2 on a turntable and to arrange one X-ray tube on the side of the object 2, facing its own fluoroscope. Therefore more X-ray images may be obtained by revolving the turntable. As shown in FIG. 13, the center line C1 of the X-ray tube 25 and the fluoroscope 29 may be arranged at an angle $\theta$ to the revolving center line C2 of the object 2 or the turntable 10.

Figure 14:
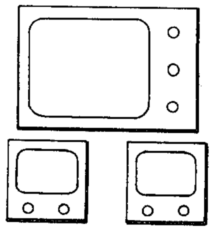
FIG. 14 and FIG. 15 are, respectively, schematic illustrations indicating another arrangement of a plurality of monitor televisions.
Figure 15:
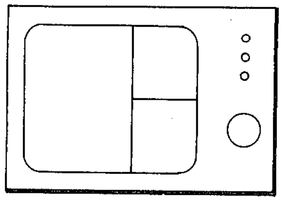

It is apparent that various changes and modification without departing from the scope and spirit of this invention, such as using a large monitor T.V. for the image in the main direction and using small size monitor T.V. for the images in other directions as shown in FIG. 14 or dividing the screen of a monitor T.V. into one large area for the main image and smaller ones for other images as shown in FIG. 15, are included within the purview of the appended claims.

We claim:

1. A low X-ray level baggage inspection apparatus comprising:

conveyor means for continuously conveying articles of baggage to be inspected in a path along a longitudinal direction;

plural X-ray tubes positioned along said path;

separate generating means coupled to each of said X-ray tubes for generating plural X-rays toward different portions of each article of baggage from plural directions;

a single image regenerating means, positioned adjacent said path to receive said plural X-rays after having passed through said each article of baggage, for producing plural X-ray images of the contents of said each article of baggage;

video signal means connected to said image regenerating means for converting said X-ray images into corresponding primary video signals;

at least one recording-reproducing means coupled to said video signal means for recording said primary video signals and for subsequently reproducing the thus recorded signals as corresponding secondary video signals;

at least one display means coupled to said recording-reproducing means for displaying said secondary video signals as corresponding visual images of said X-ray images;

at least one controlling means coupled to said recording-reproducing means for controlling the recording and reproducing functions thereof;

position detecting means for detecting when said each article of baggage is carried by said conveyor means to a predetermined position; and control device means, coupled to and operable by said position detecting means, and coupled to said generating means for activating said X-ray tubes to emit pulsed X-rays to irradiate said each article of baggage from said plural directions in a predetermined order at said predetermined position, and coupled to said controlling means for activating said controlling means when said generating means is activated to cause said recording-reproducing means to record one field primary video signal and to thereafter repeatedly reproduce said one field signal until a subsequent primary video signal is produced.

2. An apparatus as claimed in claim 1, further comprising:

means coupled to said conveyor means for stopping movement thereof;

secondary video signal means connected to said image regenerating means for converting said X-ray images into corresponding second primary video signals;

a secondary recording-reproducing means for recording a one field second primary video signal, and including a plurality of systems for repeatedly reproducing said thus recorded signal at a field cycle as corresponding second secondary video signals;

a plurality of secondary display means coupled to said systems of said secondary recording-reproducing means for displaying, at separate locations, said second secondary video signals as corresponding secondary visual images of said X-ray images;

secondary control means coupled to said secondary recording-reproducing means for controlling the recording and reproducing functions thereof; and switching means operatively coupled to said systems and said secondary control means for selectively activating said secondary control means and for generating a signal for activating said stopping means for stopping movement of said conveyor.

3. An apparatus as claimed in claim 1, wherein said plural X-ray tubes comprise three X-ray tubes equally spaced from said single image regenerating means.

4. An apparatus as claimed in claim 3, wherein said three X-ray tubes are spaced from each other along said longitudinal direction.

5. An apparatus as claimed in claim 3, wherein said three X-ray tubes are spaced from each other in a plane perpendicular to said longitudinal direction.

6. A low X-ray level baggage inspection apparatus comprising:

conveyor means for continuously conveying articles of baggage to be inspected in a path along a longitudinal direction;

first and second X-ray tubes positioned along said path;

separate first and second generating means respectively coupled to said first and second X-ray tubes for generating first and second X-rays toward different portions of each article of baggage from first and second directions;

a single image regenerating means, positioned adjacent said path to receive said first and second X-rays after having passed through said each article of baggage for producing first and second X-ray images of the contents of said each article of baggage;

video signal means connected to said image regenerating means for converting said X-ray images into corresponding primary video signals;

at least one recording-reproducing means coupled to said video signal means for recording said primary video signals and for subsequently reproducing the thus recorded signals as corresponding secondary video signals;

first and second display means coupled to said recording-reproducing means for displaying said secondary video signals as corresponding visual images of said X-ray images;

at least one controlling means coupled to said recording-reproducing means for controlling the recording and reproducing functions thereof;

first and second position detecting means for detecting when said each article of baggage is carried by said conveyor means to first and second predetermined positions; and control device means, coupled to and operable by said position detecting means, and coupled to said first and second generating means for respectively activating said first and second X-ray tubes to emit pulsed first and second X-rays to irradiate said each article of baggage from said first and second directions in a predetermined order at said predetermined positions, and coupled to said controlling means for activating said controlling means when said first and second generating means are activated to cause said recording-reproducing means to record one field primary video signal and to thereafter repeatedly reproduce said one field signal until a subsequent primary video signal is produced.

* * * * *